US012236169B2

(12) United States Patent
Wu et al.

(10) Patent No.: US 12,236,169 B2
(45) Date of Patent: Feb. 25, 2025

(54) DIGITAL TWIN UTILITY TUNNEL SYSTEM BASED ON REDUCED-ORDER SIMULATION MODEL AND REAL-TIME CALIBRATION ALGORITHM

(71) Applicant: China University of Mining and Technology-Beijing, Beijing (CN)

(72) Inventors: Jiansong Wu, Beijing (CN); Jitao Cai, Beijing (CN); Xinge Han, Beijing (CN); Chen Fan, Beijing (CN); Jian Li, Beijing (CN); Feng Kong, Beijing (CN)

(73) Assignee: China University of Mining and Technology-Beijing, Beijing (CN)

( * ) Notice: Subject to any disclaimer, the term of this patent is extended or adjusted under 35 U.S.C. 154(b) by 0 days.

(21) Appl. No.: 18/762,538

(22) Filed: Jul. 2, 2024

(65) Prior Publication Data
US 2025/0013800 A1  Jan. 9, 2025

(30) Foreign Application Priority Data
Jul. 6, 2023  (CN) .......................... 202310824920.4

(51) Int. Cl.
G06F 30/18 (2020.01)
G06F 30/28 (2020.01)
G06F 111/10 (2020.01)

(52) U.S. Cl.
CPC .............. G06F 30/18 (2020.01); G06F 30/28 (2020.01); G06F 2111/10 (2020.01)

(58) Field of Classification Search
CPC .. G06F 30/18; G06F 2111/10–2119/22; G06F 30/12; G06F 30/28; H04L 12/437
See application file for complete search history.

(56) References Cited

U.S. PATENT DOCUMENTS 12,068,076 B1 * 8/2024 Alexopoulos .......... G16H 15/00
2012/0110373 A1 * 5/2012 Muller .................. H04L 12/437
714/E11.073

(Continued)

FOREIGN PATENT DOCUMENTS

| CN | 111797572 A | 10/2020 |
| CN | 113110221 A | 7/2021 |
| CN | 115828545 A | 3/2023 |

OTHER PUBLICATIONS

"Invert", Merriam-Webster, retrieved from https://www.merriam-webster.com/dictionary/invert on Sep. 3, 2024 (Year: 2024).*

(Continued)

*Primary Examiner* — Rehana Perveen
*Assistant Examiner* — Troy A Maust
(74) *Attorney, Agent, or Firm* — Haverstock & Owens, A Law Corporation

(57) ABSTRACT

The present application provides a digital twin utility tunnel system based on a reduced-order simulation model and a real-time calibration algorithm. The system includes a big data aggregation unit and a real-time simulation deduction unit. The big data aggregation unit is configured to collect static attribute data and real-time dynamic data. The real-time dynamic data includes fixed monitoring data and mobile monitoring data. The fixed monitoring data is collected by gas sensors fixedly installed in the utility tunnel, and the mobile monitoring data is collected by mobile sensors in the utility tunnel. The real-time simulation deduction unit includes a forward prediction module and an inversion calibration module. The forward prediction module is configured to perform dimension reduction simplification and rapid prediction, and the inversion calibration module is configured to perform real-time calibration on a (Continued)

predicted physical field, correct the predicted physical field, and perform inversion on hazard sources.

2 Claims, 7 Drawing Sheets

(56) References Cited

U.S. PATENT DOCUMENTS

| | | | |
|---|---|---|---|
| 2022/0167142 A1 | 5/2022 | Myong et al. | |
| 2024/0061385 A1* | 2/2024 | Han | G05B 17/02 |
| 2024/0152724 A1* | 5/2024 | Lee | G06N 3/006 |

OTHER PUBLICATIONS

Berkooz et al. "The Proper Orthogonal Decomposition in the Analysis of Turbulent Flows" 1993, retrieved from https://www.annualreviews.org/content/journals/10.1146/annurev.fl.25.010193.002543 on Sep. 3, 2024 (Year: 1993).*

Zhang "Redis Hotspot Key Discovery and Common Solutions" 2019, retrieved from https://dzone.com/articles/redis-hotspot-key-discovery-and-common-solutions on Sep. 4, 2024 (Year: 2019).*

Flores-Cortez et al. "Design and Implementation of an IoT Based LPG and CO Gases Monitoring System" (Year: 2021).*

Cai et al. "Prediction of gas leakage and dispersion in utility tunnels based on CFD-EnKF coupling model: A 3D full-scale application" (Year: 2022).*

Poynting "Mining and Tunnel Antennas" archived by the Internet Archive Wayback Machine on Mar. 22, 2023, retrieved from https://web.archive.org/web/20230322104522/https://poynting.tech/mining-tunnel-antennas/ on Sep. 5, 2024 (Year: 2023).*

Quan "Study on numerical simulation method of pollutant diffusion law of building decoration materials" 2021 (Year: 2021).*

Zhou "Safety assessment of gas pipe gallery in most unfavorable leakage condition" 2021 (Year: 2021).*

Jo et al. "Effective sensor placement in a steam reformer using gappy proper orthogonal decomposition" 2019 (Year: 2019).*

Kaveh, A., & Habashi, W. G. (2020). Combining CFD-EFD-FFD data via Gappy Proper Orthogonal Decomposition. International Journal of Computational Fluid Dynamics, 34(2), 93-107. https://doi.org/10.1080/10618562.2020.1724973 (Year: 2020).*

Padula et al. "A brief review of Reduced Order Models using intrusive and non-intrusive techniques" Jun. 5, 2024 (Year: 2024).*

Attached is the Office Action for the Application No. 202310824920.4 dated Aug. 5, 2023.

Wang, Yuqi et al., Fire Science and Technology, vol. 37, No. 10, Oct. 2018.

Wu, Jiansong et al., Numerical Simulation Of Gas Leakage And Dispersion In Utility Tunnel Compartment Based On OpenFOAM, Journal of Safety Science and Technology, vol. 16, No. 2, Feb. 2020.

* cited by examiner

DIGITAL TWIN UTILITY TUNNEL SYSTEM BASED ON REDUCED-ORDER SIMULATION MODEL AND REAL-TIME CALIBRATION ALGORITHM

CROSS-REFERENCE TO RELATED APPLICATIONS

This application claims priority to Chinese Patent Application No. 202310824920.4 filed on Jul. 6, 2023, which is hereby incorporated by reference in its entirety.

TECHNICAL FIELD

The present application relates to the technical field of digital twinning, and in particular to a digital twin utility tunnel system based on a reduced-order simulation model and a real-time calibration algorithm.

BACKGROUND

Urban underground utility tunnel is provided with municipal pipelines such as natural gas, electricity, water supply and drainage, heat or the like as well as ancillary facilities such as fire alarms, firefighting, monitoring or the like. These municipal pipelines may involve a high-risk operating environment with significant safety risks and hazards such as gas leakage, water supply and drainage pipe bursts, and cable fires, and have characteristics of closeness and difficult evacuation. Ensuring the safe operation of the utility tunnel is an important issue required to be solved urgently.

Digital twin technology promotes digital collaborative development of various subsystems so that a physical entity is turned into a container and carrier that can be fully perceived, enabling dynamic monitoring, holographic simulation, real-time diagnosis, and accurate prediction of states of physical entities in a real environment in combination with Internet of Things, artificial intelligence (AI), big data, and other technologies, so as to provide a new intelligent management mode for the safe operation of the utility tunnel.

However, current digital twin architecture mostly focuses on three-dimensional (3D) visualization of physical entities and access display of monitoring data, and is mostly oriented to normal operation and maintenance and daily management scenes, which has not formed an intelligent twin with real-time simulation deduction, safety state diagnosis, and emergency decision-making assistance. The reasons are mainly as follows. Firstly, utilization of existing types of monitoring data mining is excessively low, which only stays at appearance of the data, and it is difficult to link the data with the meanings behind it. Secondly, existing simulation or prediction models lack timeliness, making it difficult to predict future states of physical entities in real time or even ultra real time. This ultimately leads to insufficient "virtuality-reality mapping" degrees and insufficient "control reality with virtuality" capabilities of existing digital twin models.

Therefore, there is an urgent need to provide a technical solution that addresses the above shortcomings in the prior art.

SUMMARY

An objective of the present application is to provide a digital twin utility tunnel system based on a reduced-order simulation model and a real-time calibration algorithm to solve or alleviate the above problems existing in the prior art.

In order to achieve the above objective, the present application provides the following technical solutions.

The present application provides a digital twin utility tunnel system based on a reduced-order simulation model and a real-time calibration algorithm. The digital twin utility tunnel system includes a big data aggregation unit and a real-time simulation deduction unit, the big data aggregation unit is configured to collect real-time dynamic data of an utility tunnel, the real-time dynamic data includes fixed monitoring data and mobile monitoring data, the fixed monitoring data is collected by gas sensors fixedly installed in a gas compartment of the utility tunnel, and the mobile monitoring data is collected by mobile sensors, the mobile sensors are arranged in the gas compartment of the utility tunnel and are movable in the utility tunnel; and the real-time simulation deduction unit includes a forward prediction module and an inversion calibration module. The forward prediction module is configured to perform real-time prediction on various physical field (e.g., gas concentration, temperature, airflow) in the utility tunnel based on a built reduced-order simulation model; and the inversion calibration module is configured to perform real-time calibration on the predicted physical field according to the real-time dynamic data based on the real-time calibration algorithm.

Preferably, wireless network access point (AP) devices are used in the utility tunnel and combined with directional antennas to provide network coverage for the utility tunnel, and the wireless network AP devices are connected to a ring network switch; wherein each of the wireless network AP devices is connected to two of the directional antennas, and the two of the directional antennas are installed at a middle ceiling position of a fire compartment in the utility tunnel and oppositely radiate in two extending directions of the utility tunnel.

Preferably, the big data aggregation unit is established based on a MySQL® database and configured to store hotspot data in collected data of the utility tunnel by using a Redis® database; wherein the collected data of the utility tunnel includes real-time dynamic data and static attribute data of the utility tunnel.

Preferably, the forward prediction module is further configured to: based on the physical-mechanism-based reduced-order simulation model, according to:

$$\frac{\partial \rho \varphi}{\partial t} + \frac{\partial (\rho u \varphi)}{\partial X} = \frac{\partial}{\partial X}\left(D_\varphi \frac{\partial \varphi}{\partial X}\right) + Q,$$

perform simplification for dimension reduction and rapid prediction on a 3D physical field in the utility tunnel; where $\rho$ denotes a gas density in the gas compartment of the utility tunnel; $\varphi$ denotes a gas concentration field in the utility tunnel; t denotes a duration; u denotes a dynamic viscosity; X denotes a coordinate of the utility tunnel along a utility tunnel length direction; $D_\varphi$ denotes a gas diffusion coefficient; and Q denotes a gas diffusion source in the utility tunnel.

Preferably, the inversion calibration module is further configured to correct the physical field according to the real-time dynamic data based on a pre-built coupled data assimilation model and estimate hazard sources of the utility tunnel; wherein the coupled data assimilation model is:

$$\begin{cases} \varphi_{t+1} = I\hat{\varphi}_{t+1} + \alpha E_{t+1}(O_{t+1} - P\hat{\varphi}_{t+1}) \\ E_{t+1} = C_{t+1}P^*(PC_{t+1}P^* + \Gamma)^{-1} \\ O_{t+1} = O + \eta_{t+1} \end{cases},$$

where $\varphi_{t+1}$ denotes a concentration field of the utility tunnel at a moment t+1; $E_{t+1}$ denotes a Kalman gain matrix; I denotes an algorithm weight operator; $\alpha$ denotes a damping coefficient; $O_{t+1}$ denotes real-time dynamic data collected at the moment t+1; P denotes a projection operator, P* denotes an adjoint operator of P, and $\hat{\varphi}_{t+1}$ denotes a prediction result calculated by the forward prediction module at the moment t+1; $C_{t+1}$ denotes a covariance matrix of an ensemble Kalman filter state matrix at the moment t+1; $\Gamma$ denotes an observed covariance matrix; and $\eta_{t+1}$ denotes an observation error.

Preferably, the big data aggregation unit is further configured to collect static attribute data of the utility tunnel to build a 3D geometric model according to the static attribute data and build a 3D CFD (Computational Fluid Dynamics) numerical simulation model. The forward prediction module is further configured to sample simulation results of the 3D CFD numerical simulation model based on a density function sampling method, and train an attention-mechanism-based deep learning model through sampled data, to build a data-driven reduced-order simulation model.

Preferably, the forward prediction module is further configured to perform dimension reduction on an original matrix of the simulation results of the 3D CFD numerical simulation model based on proper orthogonal decomposition (POD) according to the formula:

$$\begin{cases} X' = U \times S \times V^T \\ V = [\varphi_1, \varphi_2, \ldots, \varphi_i, \ldots, \varphi_r]; \\ Y = X' \times S \end{cases}$$

obtain a reduced-order matrix under different boundary conditions;

wherein X' denotes the original matrix of the simulation results of the 3D CFD numerical simulation model, Y denotes the reduced-order matrix after dimension reduction based on the POD, U denotes a left singular vector obtained by a singular value decomposition (SVD) operation, S denotes a diagonal matrix including singular values, and V denotes an orthogonal basis function obtained by dimensionally reducing the sampled data based on a POD-based non-intrusive ROM method; $\varphi_1, \varphi_2, \ldots, \varphi_i, \ldots, \varphi_r$ denote r left singular vectors in the orthogonal basis function V', r being a positive integer; i=1, 2, . . . , r;

perform time-series prediction on the reduced-order matrix through the attention-mechanism-based deep learning model to obtain time-series changes of the physical field after dimension reduction; and according to the formula:

$$X' = \sum_{i=1}^{r} Y_i \times \varphi_i,$$

perform a dimension-raising operation on the time-series changes of the physical field after dimension reduction to obtain prediction results of the physical field in the utility tunnel; wherein $Y_i$ denotes a column vector in the reduced-order matrix Y.

Preferably, the inversion calibration module is further configured to train the reduced-order simulation model based on simulation data of the 3D CFD numerical simulation model of the utility tunnel to obtain a pre-trained model; and correct model parameters of the pre-trained model in real time based on the real-time dynamic data preprocessed in an actual application scene, to obtain the reduced-order simulation model for adaptive tuning prediction; wherein the real-time dynamic data is preprocessed and decomposed based on a GPOD (Gappy Proper Orthogonal Decomposition) method.

Preferably, the preprocessing of the real-time dynamic data based on a GPOD method specifically includes: patching the real-time dynamic data and processing missing data and noise data based on the GPOD method.

The following beneficial effects are achieved.

In the digital twin utility tunnel system based on the reduced-order simulation model and the real-time calibration algorithm provided in embodiments of the present application, real-time dynamic data of the utility tunnel is collected through the big data aggregation unit, wherein the real-time dynamic data includes fixed monitoring data and mobile monitoring data. The fixed monitoring data is collected by gas sensors fixedly installed in a gas compartment of the utility tunnel, and the mobile monitoring data is collected by mobile sensors and they are movable in the utility tunnel. Through the forward prediction module in the real-time simulation deduction unit, a physical field in the utility tunnel is predicted in real time based on a built reduced-order simulation model; and through the inversion calibration module in the real-time simulation deduction unit, real-time calibration is performed on the predicted physical field according to the real-time dynamic data based on the real-time calibration algorithm. In this way, with simulation deduction as an internal driving core, real-time data analysis and risk assessment and early warning are performed throughout the entire process of high-fidelity restoration of physical entities, real-time simulation, and reverse control, to build a digital twin utility tunnel system. It solves the problem of low simulation deduction efficiency and realize virtuality-reality mapping and control reality with virtuality of daily operation and maintenance and emergency response scenes of the utility tunnel.

BRIEF DESCRIPTION OF THE DRAWINGS

The accompanying drawings forming part of the present application are intended to provide further understanding of the present application. Illustrative embodiments of the present application and description thereof are intended to explain the present application and do not constitute improper limitations on the present application. In the drawings.

DETAILED DESCRIPTION

The present application will be described in detail below with reference to the accompanying drawings and embodiments. Each example is provided by way of illustration of the present application and not as a limitation to the present application. In fact, it will be apparent to those skilled in the art that modifications and variations can be made in the present application without departing from the scope or spirit of the present application. For example, features shown or described as part of one embodiment may be used for another embodiment to generate yet another embodiment. Therefore, it is contemplated that the present application includes such modifications and variations failing within the scope of the appended claims and equivalents thereof.

It is found by research that an utility tunnel, as a high-risk operating environment, is provided with municipal pipelines such as natural gas, electricity, water supply and drainage, heat or the like as well as ancillary facilities such as fire alarm, firefighting, monitoring or the like. These municipal pipelines may involve significant safety risks and hazards such as gas leakage, water supply and drainage pipe bursts, and cable fires, and have characteristics of closeness and difficult evacuation. Ensuring the safe operation of the utility tunnel is an important issue required to be solved urgently.

Digital twin technology promotes digital collaborative development of various subsystems, which also provides a new intelligent management model for the safe operation of the utility tunnel. However, current digital twin architecture of the utility tunnel mostly focuses on 3D visualization of physical entities and access display of monitoring data, and is mostly oriented to normal operation and maintenance and daily management scenes, which has not formed an intelligent twin with real-time simulation deduction, safety state diagnosis, and emergency decision-making assistance.

To this end, a digital twin utility tunnel system based on a reduced-order simulation model and a real-time calibration algorithm is proposed, enabling transformation of monitoring data from "visual" to "understandable, usable, and executable", overcoming low timeliness and poor practicality caused by difficult balancing of calculation efficiency and calculation accuracy of a simulation deduction model, and expanding multi-scene application capabilities of a digital twin model in "normal scenes" and "accident scenes", to finally realize virtuality-reality mapping between a physical entity and a virtual twin model of the utility tunnel, improving a "control reality with virtuality" capability of an utility tunnel twin and facilitating daily operation, maintenance, and safety assurance of the utility tunnel.

Figure 1:
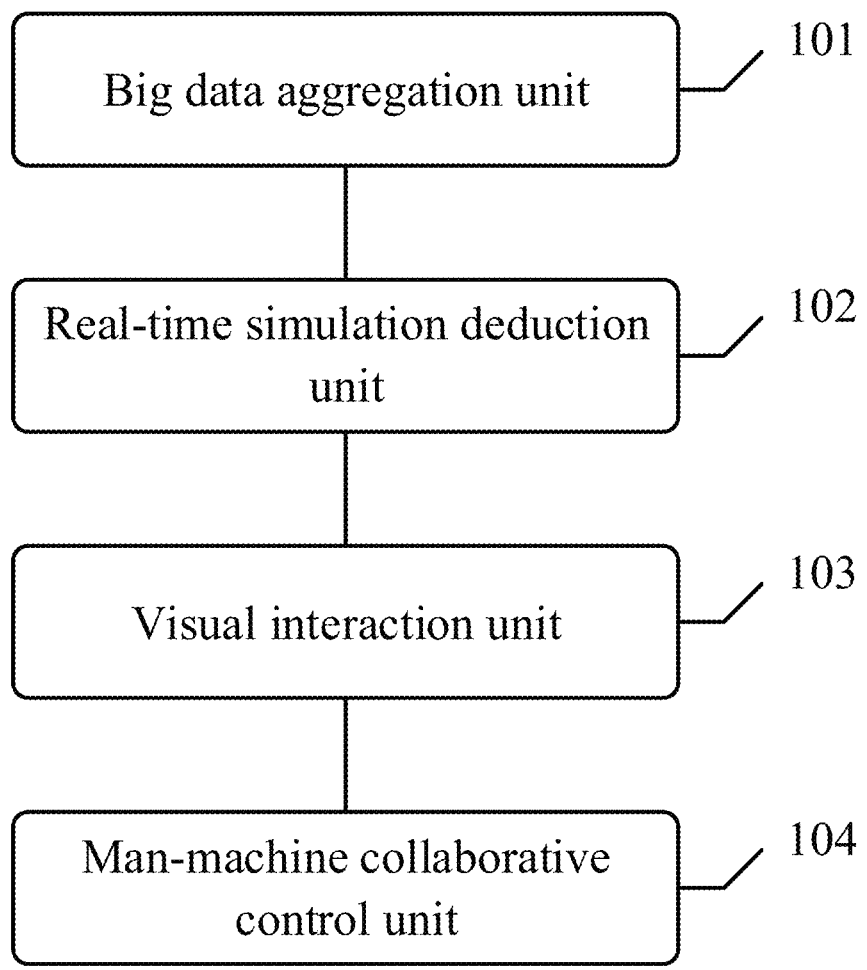
FIG. 1 is a schematic structural diagram of a digital twin utility tunnel system based on a reduced-order simulation model and a real-time calibration algorithm according to some embodiments of the present application.
Figure 2:
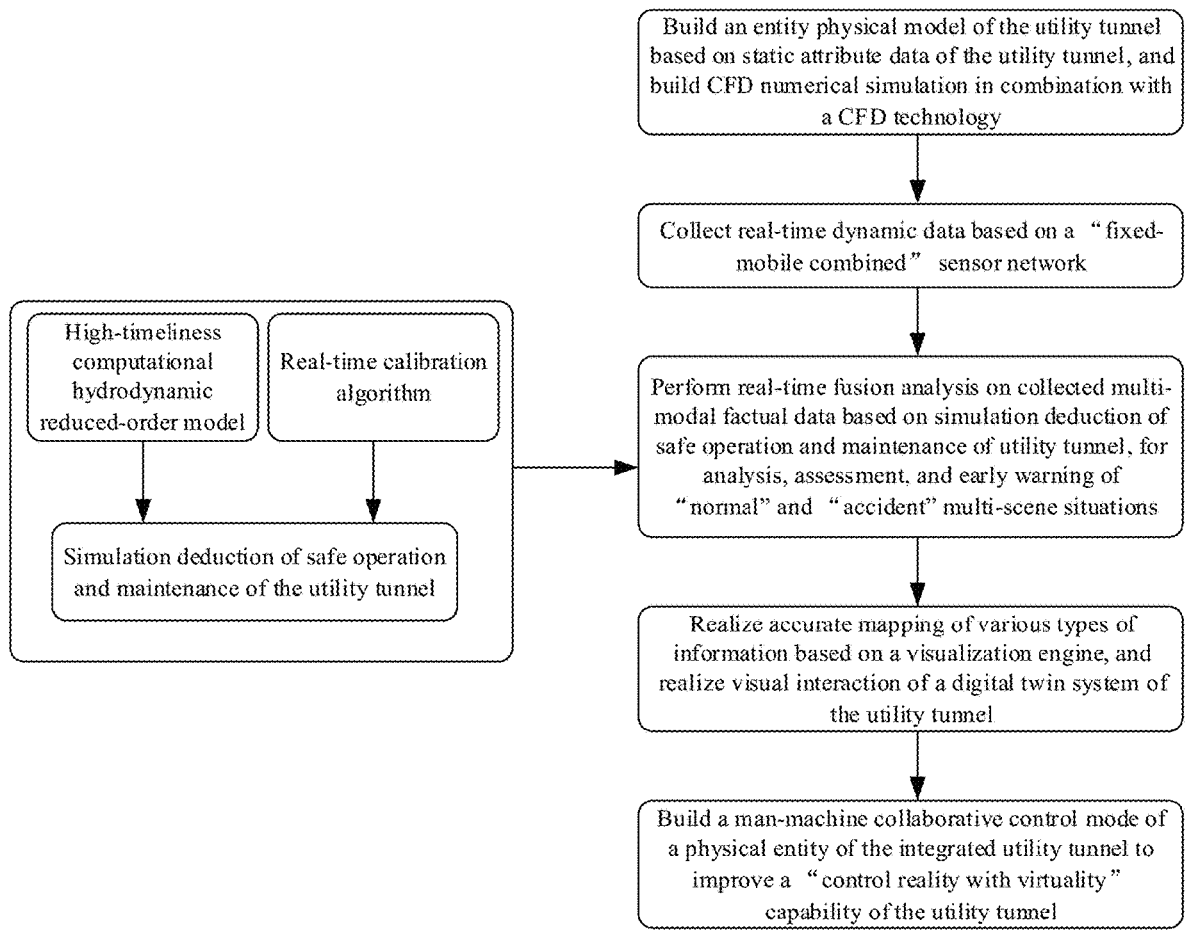
FIG. 2 is a schematic logical diagram of a digital twin utility tunnel system based on a reduced-order simulation model and a real-time calibration algorithm according to some embodiments of the present application.
Figure 3:
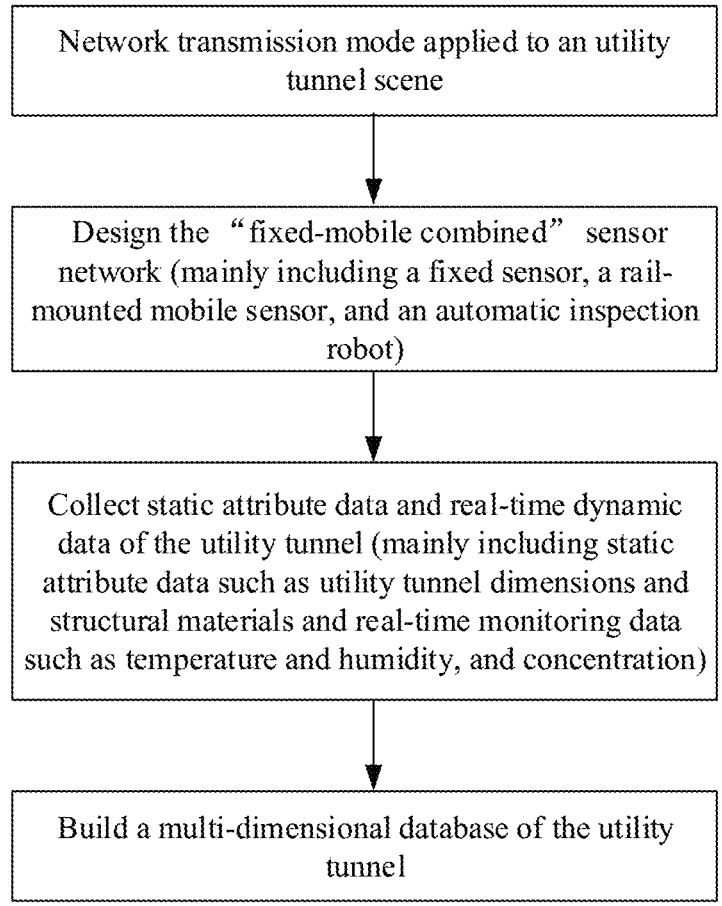
FIG. 3 is a schematic structural diagram of a big data aggregation unit according to some embodiments of the present application.
Figure 4:
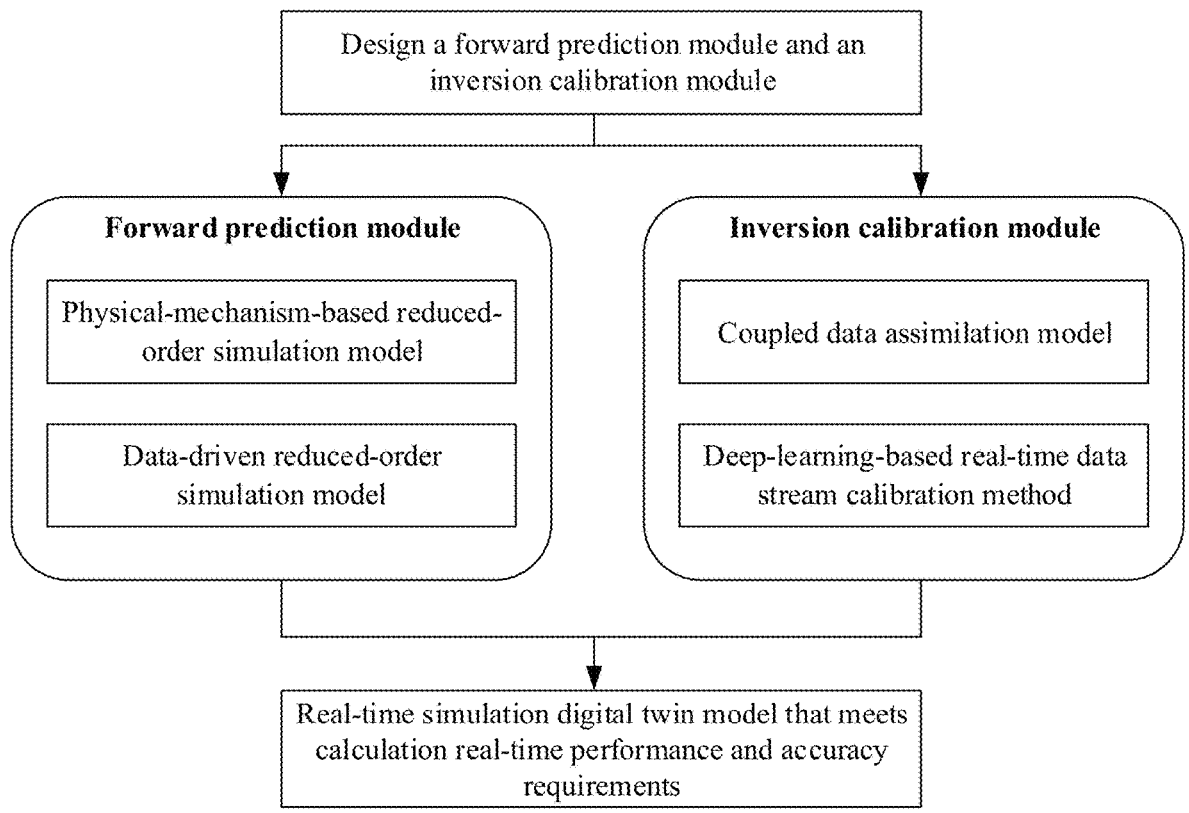
FIG. 4 is a schematic structural diagram of a real-time simulation deduction unit according to some embodiments of the present application.

As shown in FIG. 1 and FIG. 2, the digital twin utility tunnel system based on a reduced-order simulation model and a real-time calibration algorithm includes a big data aggregation unit and a real-time simulation deduction unit.

Specifically, the big data aggregation unit is built based on static attribute data and "fixed-mobile combined" real-time dynamic data of an utility tunnel. The static attribute data of the utility tunnel is applied to build a virtual twin model corresponding to a physical entity of the utility tunnel through a 3D modeling technology. The "fixed-mobile combined" real-time dynamic data is applied for real-time fusion analysis through a simulation deduction model of the built utility tunnel to realize real-time prediction and emergency decision-making in accident scenes.

Static attribute data collected by the big data aggregation unit mainly includes spatial dimensions, layout planning, construction requirements, and an operation mode of the utility tunnel and is configured to build a physical "framework" (a virtual twin model of a 3D geometry) of the utility tunnel. The real-time dynamic data mainly includes operating parameters of devices in a gas compartment and environmental parameters monitored by a monitoring device. The real-time dynamic data serving as data of the simulation deduction model becomes "flesh and blood" that drives the operation of the "framework" (analysis, prediction, and calibration).

In the present application, during building of the virtual twin model of the utility tunnel, a building information modeling (BIM) model of the utility tunnel is built through a 3D modeling technology by using the static attribute data of the utility tunnel. Specifically, a CAD drawing of the utility tunnel is imported into modeling software (such as 3Ds Max®), modeling is performed according to a scale of a drawing model, a model with a same shape as the drawing is established with a polygonal modeling method to create a basic framework of the BIM model of the utility tunnel, material properties are set, a compartment body structure, gas pipelines, fire boxes, concrete piers, cable clamps, lighting devices, cameras, ventilation fans, power distribution rooms, flow valves, sensors, fireproof doors, and other building systems and facilities are added, and corresponding functions are configured, to coordinate the building process of the BIM model, summarize conflicts and errors between various systems and elements, and complete correction and adjustment.

The BIM model is finely modeled by using additional functions of the modeling software, to build detailed shape features consistent with the entity of the utility tunnel. Materials and textures are added to the BIM model based on the entity of the utility tunnel, and retouching and segmentation are performed to match model facets of the BIM model. Redundant vertices and facets of an optimization model are deleted to reduce resource consumption, all files are packaged into an fbx format and imported into a digital twin engine (such as Unity3D), and corresponding materials and textures of the utility tunnel are mapped on the model by using a C# script.

In order to realize synchronous operation between the virtual twin model and the entity of the utility tunnel, in the present application, virtuality-reality synchronization of the utility tunnel is realized by 3D model motion drive. There are many models and elements in the virtual twin model of the utility tunnel, and the relationships between the models are complex. To make overall motion of the virtual twin model smooth, various 3D models in the virtual twin model of the utility tunnel are managed herein. In the digital twin engine, the virtual twin model is used as a root node by using a scene tree method, and child nodes in one-to-one correspondence are established according to the relationships between the models. The child nodes may further derive child nodes to build a complete scene tree structure. Herein, a prefab model in the virtual twin model is modified by using a prefab component, causing various replicated models to be associated with a parent model, so that attributes of the replicated models change as the parent changes.

Each 3D model of the digital twin model includes three basic attributes: position coordinates, a direction angle, and a size range. In a specific application scene, setting is made through the C# script to achieve data drive. For example, in an environment where a RuntimeEditor plug-in is used, the script moves the 3D model by calling transform.Translate( ) function or modifying transform.positon, and rotates a model direction by calling a transform.Rotate( ) function or using transform rotation.

In the present application, the real-time dynamic data includes fixed monitoring data and mobile monitoring data, wherein the fixed monitoring data is collected by gas sensors fixedly installed in a gas compartment of the utility tunnel, and the mobile monitoring data is collected by mobile sensors which are arranged in the gas compartment of the utility tunnel and are movable in the utility tunnel. In this way, all kinds of data in the utility tunnel are collected comprehensively and in real time based on a "fixed-mobile combined" sensor network, which can effectively reduce costs while comprehensively and flexibly collecting all kinds of data in the utility tunnel.

Specifically, gas sensors fixedly installed in the gas compartment of the utility tunnel are arranged on a ceiling of the gas compartment, and the gas sensors are installed at a distance no greater than 15 m and installed at fixed points. The mobile sensors include a rail-type sensor that can reciprocate and collect multi-space-time information within a large range and a mobile inspection robot that can carry various sensing devices.

In a specific application scene, due to existence of fireproof doors and fire compartments, a rail-mounted mobile inspection robot cannot easily cross different fire compartments. To achieve more efficient collection of mobile monitoring data, more rail-mounted mobile inspection robots are required. Alternatively, a crawler-type mobile inspection robot with an obstacle-crossing inspection capability is used. Both the rail-mounted mobile inspection robot and the crawler-type mobile inspection robot are made of carbon steel and are designed to be explosion-proof, which may isolate arcs and sparks generated by electrical devices in a shell from an explosive mixture outside the shell, and withstand explosion pressure generated when the explosive mixture entering the shell is detonated by the sparks and the arcs from the electrical devices in the shell, without causing damage to a housing.

The collected real-time dynamic data is uploaded to the cloud in real time and efficiently for analysis and utilization. The wireless signal transmission capability is weak due to more obstacles and steel structures inside the utility tunnel. In the present application, wireless network AP devices are used and combined with directional antennas to achieve network coverage in the utility tunnel. The fixed sensors and the mobile inspection robots in the utility tunnel are connected through wireless APs for data transmission. The wireless APs are connected to a ring network switch, and then are wirelessly connected to the devices in the utility tunnel.

Each of the wireless APs is connected to two directional antennas. The directional antennas are installed at a middle ceiling position of each fire compartment and radiate oppositely in two extending directions of the utility tunnel, which ensures full signal coverage in the utility tunnel. The data collected by the fixed sensor and the mobile inspection robot are transmitted to a microcontroller by digital-to-analog conversion, which converts analog signals into digital information. The microcontroller transmits multi-source data to a microprocessor through a heterogeneous information exchange channel. The microprocessor performs a filtering operation and achieves efficient dynamic data fusion of multi-source real-time monitoring data by means of data structuring, standardization, and data synchronization technologies. The gas sensors and the mobile inspection robot communicate with the wireless AP by using an Internet of Things protocol, and then the data is transmitted to a server.

Various sensors and cameras, such as fixed sensors and mobile inspection robots, may be connected through universal asynchronous receiver/transmitter (UART) serial communication, and transmission of data inside the device is realized by using a UART serial communication bus. After the microcontroller STM32 converts UART bus data into a format required by a transmission control protocol (TCP)/Internet Protocol (IP), an ESP8266 WIFI® module is connected to the wireless AP in the utility tunnel to transmit the data to an Internet of Things, to adapt to applicability of structure and signal transmission of the utility tunnel.

In the present application, the big data aggregation unit is established based on a MySQL® database to manage large volumes of data from multiple sources in the utility tunnel. Specifically, the data collected by the fixed sensor and the data collected by the mobile inspection robot are converted and then stored in the MySQL® database, and are classified in the MySQL® database according to different data sources. At the same time, hotspot data (exceeding a preset query frequency) in the collected data is stored by using a Redis® database as a buffer, which improves operational efficiency and meets timeliness of motion of the digital twin model. After the database (MySQL®, Redis®) is built, a Mysql.data.dll file is imported into the digital twin engine, the database is connected, and the data is called through the C# script, so that comprehensive information in the entire utility tunnel can be viewed in the digital twin model.

In the present application, multi-modal data collected in real time by the "fixed-mobile combined" sensor network in the utility tunnel is fused to build a multi-source heterogeneous database, the collected data is transmitted to the digital twin model through a message queuing telemetry transport (MQTT) communication protocol to realize real-time transmission of model data, sensor data, and node cloud data. When the data changes, the C# script is triggered, functions (a transform.Translate( ) function and a transform.Rotate( ) function) are triggered through an Update( )

function, and model update is driven through Transform components (transform.positon and transform.rotation).

In order to prevent repeated accumulation of instruction data, a data queue is established for received instructions in chronological order. First instruction data is executed after a current action is completed, and a number of instructions in the data queue is calculated after completion of the instructions. After new instructions are received, the first one is executed. An execution velocity of the instruction may be set to a product of an original velocity and the number of instructions in the data queue, which ensures coherent and complete actions of the model of the utility tunnel model when the instruction data is accumulated and completion accurate mapping of the physical entity of the utility tunnel to the virtual twin model.

In the present application, through building of a multi-functional, high-timeliness real-time simulation deduction unit, requirements for timeliness of the simulation deduction process and simulation deduction of multiple scenes of safe daily operation and maintenance and emergency response of the utility tunnel are met. Specifically, the real-time simulation deduction unit includes a forward prediction module and an inversion calibration module. The forward prediction module is configured to perform real-time prediction on the physical field in the utility tunnel based on a built reduced-order simulation model. The inversion calibration module is configured to perform real-time calibration on the predicted physical field according to the real-time dynamic data based on the real-time calibration algorithm.

Through the forward prediction module and inversion calibration module, a combination of real monitoring data and simulation deduction is achieved, and deviation in a prediction trajectory during forward prediction is corrected by using the real-time monitoring data, which improves prediction accuracy and ensures continuous suppression of model errors and monitoring errors, thereby achieving a prediction effect consistent with a realistic scene.

In the present application, during real-time simulation deduction, a physical-mechanism-based reduced-order simulation model may be used. That is, in combination with long and narrow structural features of the utility tunnel, low-dimensional operations can be directly performed on hydrodynamics characteristics, thereby achieving simulation deduction by using a low-dimensional model. Alternatively, simulation deduction is performed by using a data-driven reduced-order simulation model, and the reduced-order simulation model is trained through 3D high-confidence numerical simulation data based on a dimension-reduction algorithm that integrates POD and deep learning, to achieve high-timeliness simulation deduction.

Currently, situation assessment for daily operation and maintenance scenes and accident and disaster scenes in the utility tunnel mainly involves simulation deduction of hydromechanics. Herein, taking a daily ventilation and gas leakage scene as an example, a set of hydrodynamic control equations is built, including:

a continuity equation, $$\frac{\partial \rho}{\partial t} + \nabla \cdot (\rho U') = 0$$

a set of momentum conservation equations, $$\begin{cases} \frac{\partial (\rho u)}{\partial t} + \nabla \cdot (\rho u U') = -\frac{\partial p}{\partial x} + \nabla \cdot (\mu \nabla u) \\ \frac{\partial (\rho v)}{\partial t} + \nabla \cdot (\rho v U') = -\frac{\partial p}{\partial y} + \nabla \cdot (\mu \nabla v) \\ \frac{\partial (\rho w)}{\partial t} + \nabla \cdot (\rho w U') = -\frac{\partial p}{\partial z} + \nabla \cdot (\mu \nabla w) \end{cases}$$

an energy conservation equation, $$\frac{\partial (\rho i)}{\partial t} + \nabla \cdot (\rho i U') = -p \nabla \cdot U' + \nabla \cdot (k \nabla T) + \Phi$$

a multicomponent gas conservation equation, $$\frac{\partial}{\partial t}(\rho c) + \nabla \cdot (\rho c U') = \nabla \cdot (D \nabla c) + S,$$

and
an ideal gas equation, $$pV' = nZRT$$

where $\rho$ denotes a gas density in the utility tunnel; U' denotes a velocity vector of gas diffusion in the utility tunnel; u, v, and w denote components of the velocity vector in 3D directions x, y, and z respectively; t denotes a duration; p denotes a gas pressure in the utility tunnel; u denotes a dynamic viscosity; i, T, and $\Phi$ denotes an internal heat energy, a temperature, and a dissipation function respectively; c denotes a concentration of each component gas, herein mainly including air and methane; D denotes a gas diffusion coefficient; S denotes a gas release source term (i.e., the gas diffusion source in the utility tunnel); and V', n, Z, and R denote a gas volume, molar mass, compressibility, and a gas constant respectively.

In consideration of a complex flow field in a daily ventilation and accident scene in the utility tunnel, to reduce an impact of turbulent disturbance on the physical field during the prediction to obtain relatively high calculation efficiency and accuracy, a Reynolds-averaged Navier-Stokes equation (RANS) is used as a main turbulence control model, which is as follows:

$$\begin{cases} \frac{\partial (\rho k)}{\partial t} + \nabla \cdot (\rho k U') = \nabla \cdot ((\mu + \sigma_\omega \mu_t) \nabla k) + P - \rho \beta^* \omega k \\ \frac{\partial (\rho \omega)}{\partial t} + \nabla (\rho \omega U') = \nabla \cdot ((\mu + \sigma_\omega \mu_t) \nabla \omega) + \frac{\gamma}{v_t} P - \rho \beta \omega^2 + 2(1 - F_1) \frac{\rho \sigma_{\omega 2}}{\omega} \nabla k \nabla \omega \end{cases}$$

where k and $\omega$ denote turbulent kinetic energy and a dissipation rate; P denotes a turbulence generation rate; $\mu_t$ denotes a turbulent viscosity; and others are model constants.

However, it is found by research that during simulation deduction of a multi-application scene of the utility tunnel, the digital twin model has problems with timeliness of real-time bidirectional data transmission and synchronization of time series of the physical entity of the utility tunnel. To this end, in the present application, simulation deduction is realized mainly through dimension reduction and order reduction.

In a specific application scene, in combination with narrow and long space characteristics of the utility tunnel, in a gas accident scene, under an action of mechanical ventilation of the utility tunnel, leaking gas may quickly form a "one-dimensional" flow in a downwind direction, realizing dimension-reduction calculation of the gas diffusion process in the utility tunnel based on the one-dimensional convective diffusion process. Specifically, the forward prediction module is further configured to perform, by the physical-mechanism-based reduced-order simulation model, simplification for dimension reduction and rapid prediction on a 3D physical field in the utility tunnel according to $$\frac{\partial \rho \varphi}{\partial t} + \frac{\partial (\rho u \varphi)}{\partial X} = \frac{\partial}{\partial X}\left(D_\varphi \frac{\partial \varphi}{\partial X}\right) + Q$$

where $\rho$ denotes a gas density in the utility tunnel; $\varphi$ denotes a concentration field in the utility tunnel; t denotes a duration; u denotes a dynamic viscosity; X denotes coordinates of the utility tunnel along a utility tunnel length direction; $D_\varphi$ denotes a gas diffusion coefficient; and Q denotes a gas diffusion source in the utility tunnel.

In addition, in the present application, existing experimental data is further utilized to verify convective diffusion of the gas in the utility tunnel.

Specifically, according to the formula:

$$\frac{1}{A}\int \varphi \, dA = \frac{1}{A}\sum_{l=1}^{n} \varphi_l |A_l|$$

convective diffusion of the gas in the utility tunnel is verified. Verification of the one-dimensional convective diffusion model is achieved through area integral of calculation results of a 3D CFD numerical simulation model on a cross-section of the utility tunnel. A denotes a cross-sectional area of the utility tunnel, $\varphi_l$ denotes a value of a physical quantity at $l^{th}$ grid in the 3D CFD numerical simulation model, $A_l$ denotes a grid area of the $l^{th}$ grid, and n denotes a number of grids in the 3D CFD numerical simulation model.

Figure 5:
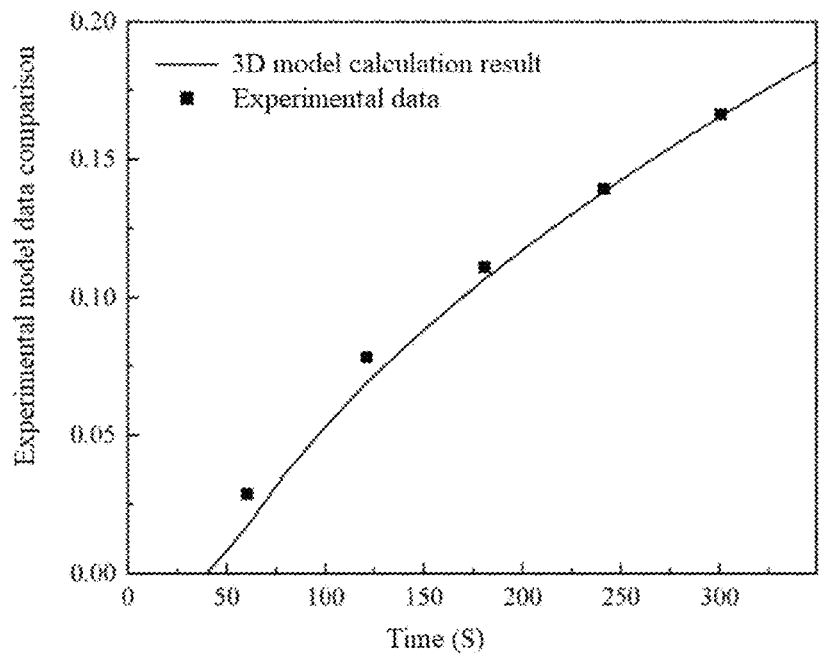
FIG. 5 shows 3D model verification results based on experimental data according to some embodiments of the present application.
Figure 6:
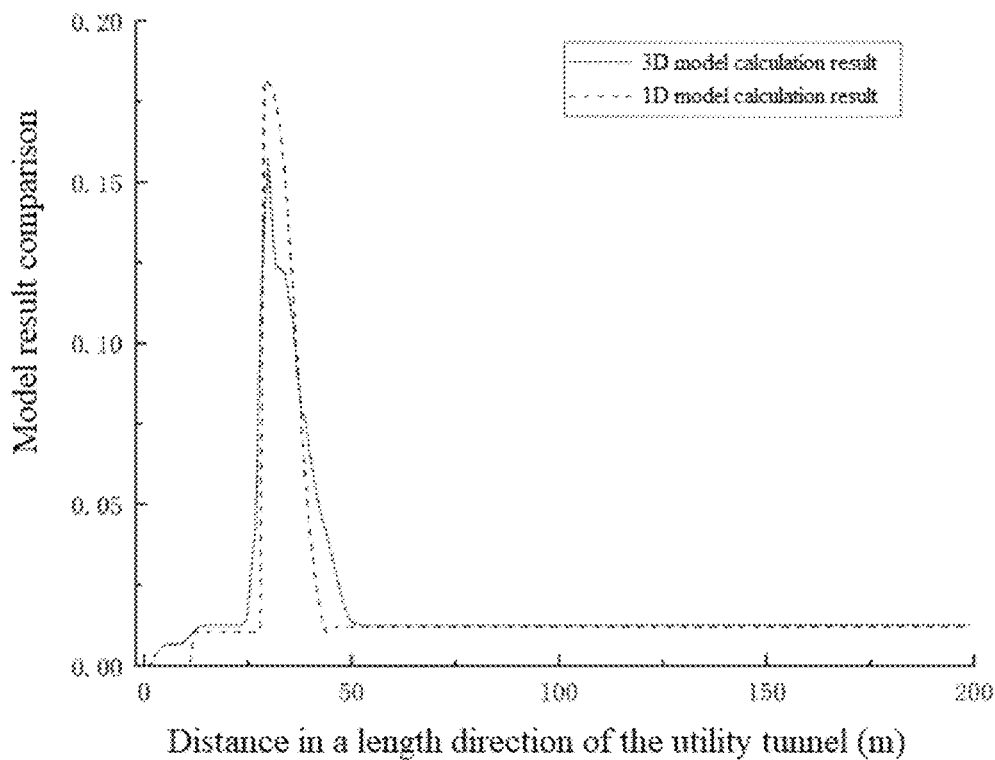
FIG. 6 shows one-dimensional model verification results of a forward prediction model based on 3D model calculation results that are established according to one-dimensional convective diffusion according to some embodiments of the present application.

As shown in FIG. 5 and FIG. 6, for example, an average value is obtained through area integral of a physical quantity value at the 20-m section, and error comparison is performed based on the average value and a calculated value of a forward prediction model based on one-dimensional convective diffusion at 20 m. If an average value of error comparison results at all positions is less than or equal to 5%, the forward prediction model based on one-dimensional convective diffusion is considered reasonable. FIG. 5 and FIG. 6 respectively show 3D model verification results based on experimental data and one-dimensional model verification results of a forward prediction model based on 3D model calculation results that is established according to one-dimensional convective diffusion. As can be seen from the comparison results, the calculation results of the forward prediction model based on one-dimensional convective diffusion have a small error with the experimental data, which may be fully used to calculate and evaluate a natural gas leakage scene of the utility tunnel.

After the 3D physical field in the utility tunnel is predicted based on one-dimensional convective diffusion, prediction results are corrected through the inversion calibration module. Specifically, the inversion calibration module is further configured to correct the predicted physical field according to the collected real-time dynamic data based on a pre-built coupled data assimilation model and estimate hazard sources of the utility tunnel. The coupled data assimilation model is:

$$\begin{cases} \varphi_{t+1} = I\hat{\varphi}_{t+1} + \alpha E_{t+1}(O_{t+1} - P\hat{\varphi}_{t+1}) \\ E_{t+1} = C_{t+1}P^*(PC_{t+1}P^* + \Gamma)^{-1} \\ O_{t+1} = O + \eta_{t+1} \end{cases}$$

where $\varphi_{t+1}$ denotes a concentration field of the utility tunnel at a moment t+1, whose value is a state vector in an ensemble Kalman filter state matrix at the moment t+1; $E_{t+1}$ denotes a gain matrix; I denotes an algorithm weight operator; $\alpha$ denotes a damping coefficient; $O_{t+1}$ denotes real-time dynamic data collected at the moment t+1; P denotes a projection operator, P* denotes an adjoint operator of P, and $\hat{\varphi}_{t+1}$ denotes a prediction result calculated by the forward prediction module at the moment t+1; $C_{t+1}$ denotes a covariance matrix of an ensemble Kalman filter state matrix at the moment t+1; $\Gamma$ denotes an observed covariance matrix; and $\eta_{t+1}$ denotes an observation error. Herein, it is to be noted that $\varphi$ denotes the concentration field of the utility tunnel in the application scene, which is merely an example herein. $\varphi$ may alternatively denote another physical quantity in the utility tunnel scene, such as a velocity field or a temperature field.

Figure 7:
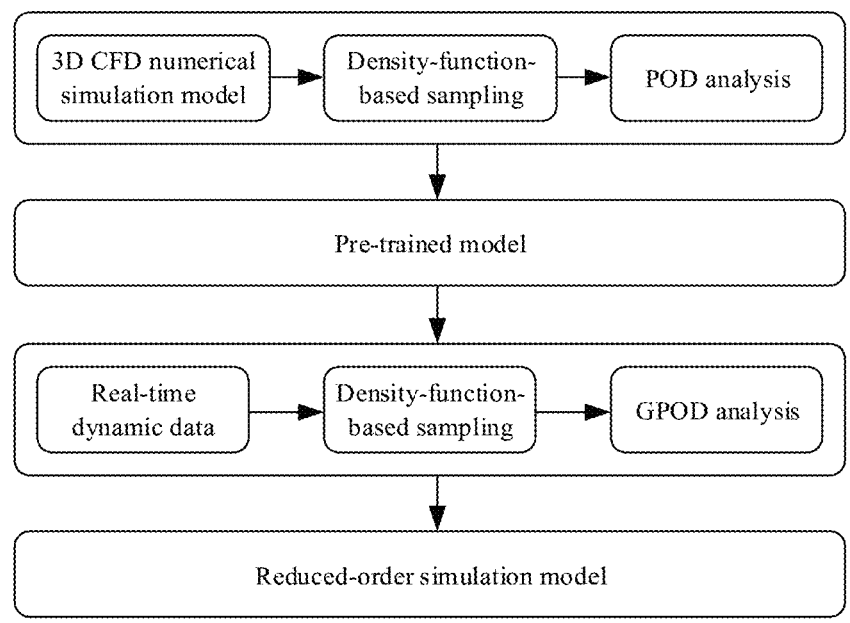
FIG. 7 is a schematic logical diagram of building a reduced-order simulation model based on data drive according to some embodiments of the present application.

In another specific application scene, as shown in FIG. 7, based on data-driven model order reduction, deep learning and training of large volumes of multi-condition simulation data are performed to build a reduced-order model that meets real-time performance and generalization capabilities in actual scenes. Specifically, a 3D entity physical model of the utility tunnel is built according to the static attribute data of the utility tunnel collected by the big data aggregation unit, and a 3D CFD numerical simulation model is built. Then, the forward prediction module samples simulation results of the 3D CFD numerical simulation model based on a density function sampling method, and trains an attention-mechanism-based deep learning model through sampled data, to build a data-driven reduced-order simulation model.

In the present application, multi-condition simulation is performed by using the 3D CFD numerical simulation model, to determine correspondence between static attribute data of the 3D CFD numerical simulation model, such as geometric meshes, boundary conditions, and material attributes, and physical quantities, such as velocities, pressure, temperatures, components, and flow rates. Moreover, data processing is performed on the correspondence to form a data format easily read by a deep learning model. Finally, a reduced-order model is built by a transformer, to improve timeliness and practicality of 3D simulation deduction.

Specifically, based on the density function sampling method, a centroid of each Voronoi region of the 3D CFD numerical simulation model is calculated to achieve sampling. In the present application, an open set $\Omega \subseteq \mathbb{R}^{N_D}$ and a point set $z_o \in \Omega$, $o=1, \ldots, s$ are defined, where S denotes a positive integer, and a Voronoi region $\hat{V}_o$ corresponding to a point $Z_o$ is defined as:

$$\hat{V}_o = \{x \in \Omega \mid x - z_o < x - z_j \text{ for } j = 1, \ldots, s, j \neq o\}$$

A point $\{z_o\}_{o=1}^s$ is called a generator of the Voronoi region, and a set $\{\hat{V}_o\}_{o=1}^s$ is called a Voronoi tessellation of $\Omega$. For a density function $\rho(x)$ defined in the Voronoi region, a centroid $z^*_o$ of a Voronoi region $V_o$ may be determined through the formula:

$$z_o^* = \frac{\int_{V_o} x\rho(x)dx}{\int_{V_o} \rho(x)dx}$$

Then, the sampled data is analyzed using a non-intrusive ROM method based on POD and multidimensional interpolation. Specifically, POD is performed for snapshot data of the collected simulation results (a collection of sampled data at a certain moment, e.g., a collection $\{x_1, x_2, \ldots, x_n\}$ of sampled data at a moment $t_1$), to obtain an orthogonal basis function. Then, the sampled data is mapped into a POD space by using a multidimensional interpolation method, and an ROM is built.

Herein, through the POD decomposition on the sampled data, high-dimensional data is reduced to low dimensions, and a most representative pattern is extracted. Firstly, a set of basis functions is extracted from the sampled data and used to build the ROM. Then, the ROM is optimized and predicted by multidimensional interpolation. Specifically, the simulation results include m pieces of snapshot data (i.e., a collection of m pieces of sampled data at moments $t_1$ to $t_m$), and each snapshot includes n data points (i.e., a sampling data set at each moment includes n pieces of sampling data). Then, the data points form an m×n matrix X'. That is, the snapshot data at all moments ($t_1$ to $t_m$) forms an m×n matrix X' (i.e., an original matrix).

According to the formula:

$$X' = U \times S \times V^T$$

SVD is performed on the original matrix X'. U denotes an m×n orthogonal matrix, S denotes an m×n diagonal matrix, and I' denotes an m×n orthogonal matrix. Column vectors in U and V become a left singular vector and a right singular vector, and diagonal elements in S become singular values. According to the definition of the POD method, the first r left singular vectors constitute a set of orthogonal basis functions:

$\varphi_1, \varphi_2, \ldots, \varphi_i, \ldots, \varphi_r$, r is a positive integer, and $r \leq \min(m,n)$. That is, $$V = [\varphi_1, \varphi_2, \ldots, \varphi_i, \ldots, \varphi_r].$$

Since each snapshot in the simulation results of the 3D CFD numerical simulation model often includes hundreds of thousands or even millions of pieces of data, herein, the original matrix X' is dimensionally reduced with a POD-based non-intrusive ROM method according to the formula:

$$Y = X' \times S$$

to obtain a reduced-order matrix Y after dimension reduction based on the POD; where S denotes a diagonal matrix including singular values. It is to be noted that even if after dimension reduction based on the POD, complex matrix operations are still required during time-series prediction. Based on this, it is proposed to use an attention-mechanism-based deep learning model to perform time-series prediction on the reduced-order matrix after dimension reduction, so as to greatly improve timeliness of the time-series prediction. Specifically, the reduced-order matrix is predicted and optimized according to a timing combination mode by using the attention-mechanism-based deep learning model. In the attention-mechanism-based deep learning model, an encoding component includes multiple layers of encoders, and a decoding component includes a same number of layers of decoders. Each decoder includes two sub-layers (a self-attention layer and a feedforward network). Each encoder has a same structure but uses a different weight parameter. Output of modal results after a period of time is predicted through time-series modal input by using the deep learning model, to achieve rapid and accurate prediction of 3D physical fields (such as velocity, pressure, temperature, and component).

After time-series prediction on the reduced-order matrix after dimension reduction, time-series changes of the physical field after dimension reduction are obtained. However, in practical applications, there is a need to make judgments through full information of the utility tunnel. Therefore, the obtained prediction results after dimension reduction further require a dimension raising operation, that is, matrix reduction is performed on the prediction results of the reduced-order matrix to obtain prediction results of the physical field in the utility tunnel. Specifically, at a time point when the full information of the utility tunnel is required to be acquired, according to the formula:

$$X' = \sum_{1}^{r} Y_i \times \varphi_i$$

the dimension raising operation, that is, a POD inverse operation, is performed on the time-series changes of the physical field after dimension reduction, to achieve matrix reduction of the reduced-order matrix and obtain the prediction results of the physical field in the utility tunnel. $Y_i$ denotes a column vector in the reduced-order matrix Y.

Through the above steps, the original matrix of the simulation results of the 3D CFD numerical simulation model is dimensionally reduced based on POD, to obtain the reduced-order matrix. Time-series prediction is performed on the reduced-order matrix, to realize advancement of the physical field in a time dimension. Finally, through the POD inverse operation, matrix reduction of the reduced-order matrix is achieved, and the full information of the utility tunnel is obtained. In this way, fast and accurate prediction of the 3D physical fields (such as velocity, pressure, temperature, and component) of the utility tunnel is achieved.

In an actual application scene, through a data-driven order reduction method, the attention-mechanism-based deep learning model is pre-trained using generated data of the 3D CFD numerical simulation model, and data streams collected in real time are used for model optimization and correction. Specifically, the reduced-order simulation model is trained based on simulation data of the 3D CFD numerical simulation model of the utility tunnel to obtain a pre-trained model; then, model parameters of the pre-trained model are corrected in real time based on the real-time dynamic data preprocessed in an actual application scene, to enable the reduced-order simulation model for adaptive tuning prediction. Herein, the real-time dynamic data is preprocessed and decomposed based on a GPOD method, so that the real-time dynamic data in the actual application scene can meet a requirement of a reduced-order simulation model.

In the present application, the real-time dynamic data is sparser than the simulation data of the 3D CFD numerical simulation model and cannot be directly combined with the simulation data of the 3D CFD numerical simulation model. Therefore, the real-time dynamic data is preprocessed with the GPOD method. Specifically, based on the GPOD method, operations such as removing noise and filling in missing values are performed on the real-time dynamic data. In the case of filling in missing values, a binary mask vector is defined for each piece of snapshot data to describe where the data is available and where the data is missing. Then, in each iteration step, POD is applied to a database, a result of a previous step is used as new prediction for gap data, and at the same time, original data is kept at a non-gap position. The mask vector is defined as:

$$d_f = \begin{cases} d_f^h = 0 \text{ if } U_f^h \text{ is missing} \\ d_f^h = 1 \text{ if } U_f^h \text{ is known} \end{cases}$$

where $U_f^h$ corresponds to an $h_{th}$ component of snapshot data $U_f$.

$\zeta=\{\zeta_1, \ldots, \zeta_{f_1}, \ldots, \zeta_{f_2}, \ldots, \zeta_{D_s}\}$ is defined as a POD base set of a snapshot set $U=\{U_1, \ldots, U_{f_1} \ldots U_{D_s}\}$, where all snapshots $U_f$ are complete. If g is an incomplete snapshot, there are some missing elements and associated mask vectors $d_f$. If behaviors of vectors in g may be defined by the complete snapshot set U, a current POD base set $\zeta$ may be used to rebuild the incomplete snapshot g into the complete snapshot set U, and an intermediate repair vector $\tilde{g}_d$ may be written as:

$$\tilde{g}_d \approx \sum_{f=1}^{N_m} b_f \varphi_f$$

where $N_m$ denotes a highest energy POD basis vector corresponding to a number of modes or according to a desired energy level; $N_m$ is always less than a total number of snapshots $N_S$; and a coefficient $b_f$ is obtained by minimizing an error vector between the original vector g and the repair vector $\tilde{g}_d$. The error vector is defined as:

$$E = g - \tilde{g}_d^2$$

where E denotes an error vector between the original vector and the repair vector.

In order to solve the problem of minimization of the error vector, errors of all $b_f$ vectors are differentiated to obtain a system of linear equations in the following form:

$$Mb=h$$

where $M_{f_1 f_2}=(\zeta_{f_1}, \zeta_{f_2})_d$, $h_{f_1}=(g, \zeta_{f_1})_d$, $M \in \mathbb{R}^{D_s \times D_s}$, $f_1, f_2 \in \mathbb{R}^{D_s}$, $b \in \mathbb{R}^{D_s}$. The intermediate repair vector $\tilde{g}$ may be obtained by solving a system of linear equations. Finally, missing elements in g are replaced with corresponding repair elements obtained from the linear equations. That is, when $d_{f_1}=0$, $g=\tilde{g}_d$.

In the present application, a combination of real monitoring data and prediction data is realized through the real-time simulation deduction unit, and deviation in the prediction is corrected using monitoring data, which improves prediction accuracy and ensures continuous suppression of model errors and monitoring errors, thereby obtaining prediction results consistent with a realistic scene, expanding multi-scene application capabilities of "normal scenes" and "accident scenes" of the digital twin model, and realizing seamless switching of multiple scenes in the digital twin system of the utility tunnel. For example, in a daily operation and maintenance scene, intelligent ventilation optimization and utility tunnel operation and maintenance cost reduction and efficiency improvement are achieved through evaluation and analysis of wind fields, temperature fields, and power consumption. In an accident emergency scene, intelligent auxiliary decision-making and scientific emergency response goals for unexpected gas accidents are achieved through prediction and early warning of wind fields and gas concentration fields. In this way, real-time fusion analysis is performed on collected multi-modal data based on simulation deduction of safe operation and maintenance of the utility tunnel, to realize analysis, assessment and early warning of "normal" and "accident" multi-scene situations.

Figure 8:
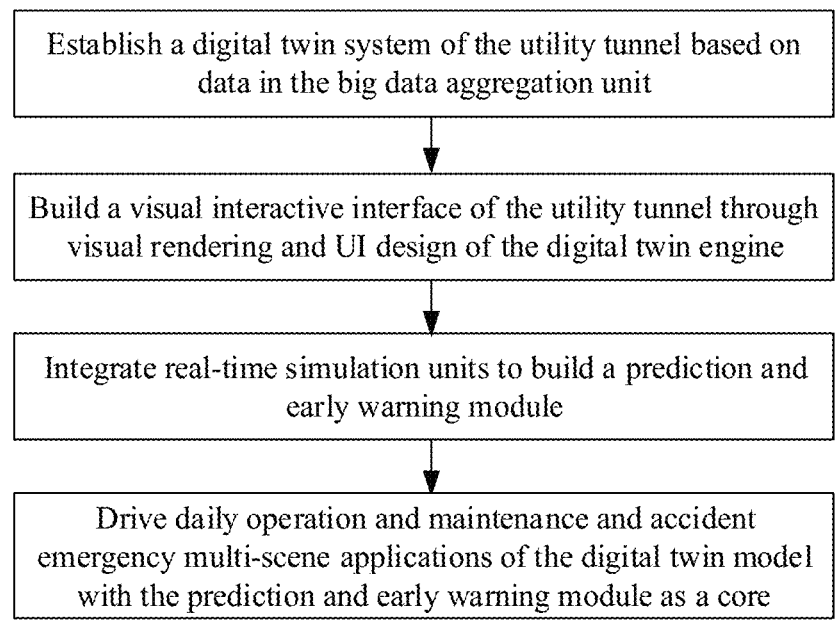
FIG. 8 is a schematic structural diagram of a visual interaction unit according to some embodiments of the present application.
Figure 9:
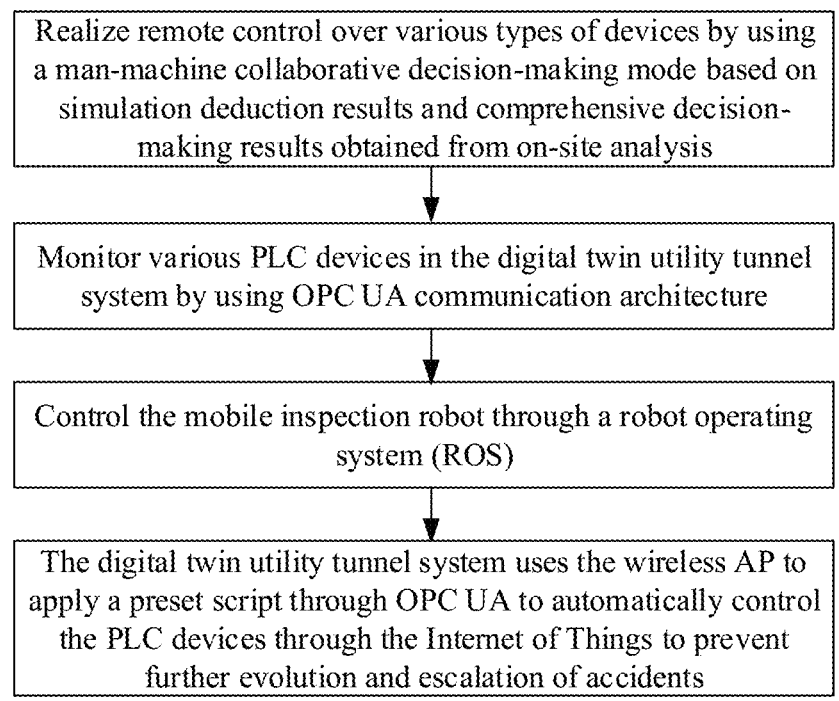
FIG. 9 is a schematic structural diagram of a man-machine collaborative control unit according to some embodiments of the present application.

In addition, the digital twin utility tunnel system based on the reduced-order simulation model and the real-time calibration algorithm further includes: a visual interaction unit and a man-machine collaborative control unit, as shown in FIG. 8 and FIG. 9. Through the visual interaction unit, accurate mapping of various types of information is realized based on a visual engine, and visual interaction of the digital twin system of the utility tunnel is realized. Through the man-machine collaborative control unit, a man-machine collaborative control mode of the physical entity of the utility tunnel is built, and a "control reality with virtuality" capability of the utility tunnel is improved.

Through visual rendering and user interface (UI) design, visual interaction of the utility tunnel is built to achieve precise mapping of the physical entity to virtual digitalization and convenient operations of application functions. Then, man-machine collaborative control over the utility tunnel is built, comprehensive decisions are made based on simulation deduction results and observations of on-site personnel, control over a man-machine system of the physical entity of the utility tunnel is realized, and a "control reality with virtuality" capability of the utility tunnel, such as intelligent energy-saving ventilation, accident and disaster source tracing, and robot man-machine emergency action command, is improved.

Specifically, data visualization is realized by designing an appropriate UI through the digital twin engine, and the UI mainly includes a text box, a button, a drop-down menu, and the like. When the UI is designed, there is a need to set a parent-child relationship between all UI components and a Canvas module, which is established on child nodes of the Canvas module.

In the management of the utility tunnel, there is a need to frequently select, mark, and record data and monitoring nodes. Herein, UI components are rendered on an upper layer of a camera by Screen Space-Overlay rendering to facilitate interactive operations, and interactive functions are designed using an OnGUI( ) function.

The digital twin engine receives data through a database interface, displays specific parameter information of the collected data through charts, and displays various icons through chart plug-ins. The data collected by the mobile inspection robot in the utility tunnel displays data changes and distribution through a heat cloud map, and a certain number of points are created at fixed distances. A C# script is added to each point, temperature values at corresponding positions thereof are assigned, and by use of correspondence between color values and temperature data values, color changes between each point are linear changes, to generate the heat cloud map, which represents data differences and distribution through color depths. Sensor data at all positions recorded in the cloud and the data collected by the mobile inspection robot show comprehensive distribution of environmental parameters of the utility tunnel by 3D visualization.

The method of directly displaying the parameters in the utility tunnel through charts and data is very specific, but is not comprehensive. A manager of the utility tunnel cannot easily and clearly understand an overall situation of the utility tunnel, and further needs to render the collected data of the utility tunnel to display an overall environment. Specifically, during the rendering, offline rendering is performed through the engine, and undesired data is deleted using methods such as visual frustum (coarse-grained) culling and hierarchical culling. Coordinate transformation and per-vertex lighting are performed by using a fixed-point shader. Pixels in rendering primitives are merged, blended, and drawn by rasterization. Fragment colors are determined by using a fragment shader and according to a gl_FragColor( ) method, which are written into a color buffer to improve a visualization effect of the virtual twin model of the utility tunnel. Finally, the digital twin engine generates images and interacts with users in real time.

After generating a WebGL file, the digital twin engine (such as Unity3D) communicates with a Javascript® engine, and a jslib file is created in the digital twin engine and is written into a script that calls a Javascript® function. Then, the above function is called through the C# script. The jslib file serves as an intermediate file to cause the digital twin engine to communicate with a front-end file WebGL. Next, there is also a need to create an Html web page, a Javascript® file, and an external CSS style file. A CSS file is applied to Web and WebGL styles, the Javascript® file is used for a communication interface between Unity and iframe components, and an html file is used for Web applications. The html file is run, and Unity is embedded into a Web front-end page, realizing communication between Unity and the Web and realizing a front-end real-time interaction scene.

A prediction and early warning module are designed through the digital twin engine, prediction and early warning of internal data of the utility tunnel are realized using digital twin scripts and plug-ins, a prediction information UI window is designed through a Runtime Editor plug-in, and a C# script is written and added to the window. The script realizes functions of receiving predictive information in the database and displaying the predictive information in real time. The digital twin utility tunnel system adds cameras in the utility tunnel through a Videoplay plug-in, connects a monitoring video stream and a robot camera video stream in real time through an RTSO protocol, calls an Open( ) interface, and acquires a push instance, to view a real environment in real time and comprehensively display the situation in the utility tunnel in combination with various data. GetRawTextureData( ) is called by using a native SDK interface of the camera to acquire original data, and then an OnPostRGBAData( ) interface is called and cooperates with a SmartPlayer player to play a camera video to display images of the mobile inspection robot in real time.

Through digital twin utility tunnel roaming, staff can have an immersive feeling when touring a virtual scene of the utility tunnel, replacing the traditional staff entry solution. In order to realize a roaming function, there is a need to select a viewing angle of an observer, select a capsule model as a roaming character in the digital twin engine, add a camera module to the capsule model, write a free motion program for the capsule model to make it a camera for free observation, and set a script for the capsule model to prohibit a capsule from passing through a wall of the virtual scene. A preset CameraController script, a PlayerController script, and a FirstPersoController in a Unity base package are added to the camera, a position of a viewing-angle model may be moved using a keyboard, and a viewing angle is rotated by 360° by using a mouse, realizing free virtual roaming of the utility tunnel.

In order to implement an early warning function of the digital twin utility tunnel system, a warning model class and a warning UI window are created, a "WarningWindow" script is added to the UI window, and the "WarningWindow" script is written to implement functions of monitoring parameters and popping up the window. When a parameter exceeds a safe range or abnormal information is predicted, the script is triggered, and early-warning information is displayed on the UI window. In this way, by use of a visual interaction function of the digital twin utility tunnel system, real-time evolution under daily operation and maintenance and accident emergency situations of the utility tunnel can be more intuitively and efficiently understood from decision-making and management levels, thereby greatly improving corresponding efficiency of decision-making and realize safe operation and maintenance of the utility tunnel.

In the present application, through the man-machine collaborative control unit in the digital twin utility tunnel system, simulation deduction results and comprehensive decision-making results obtained from on-site analysis can be combined to realize remote control over various types of devices by using man-machine system control, and remote control over various Internet of Things devices is realized through remotely controlling the fixed sensor, the mobile inspection robot, and the Internet of Things devices by using the wireless APs and a remote control tool.

In communication with various programmable logic controllers (PLCs) in the utility tunnel, various PLC devices in the digital twin utility tunnel system are monitored by using OPC UA communication architecture, which can adapt to various complex data types, improve communication credibility and security, and effectively solve the problem of difficult communication between devices and systems and "information islands" due to different sources of devices and selection of different communication protocols and specifications.

A PLC logic controller in the utility tunnel transmits data to a gateway through a WIFI® module. The gateway transmits the data to an OPC UA server for management. The OPC UA server parses the data and stores the data in a corresponding address space for transmission. The digital twin engine calls an API interface to acquire the data. The API interface communicates in a form of Socket.

The C# script written in the digital twin engine is called to conduct transmission control protocol (TCP) Socket communication to transmit client data to the digital twin engine. The PLC in the utility tunnel is equipped with interfaces such as wireless communication and serial communication, and the wireless AP is connected to the PLC via OPC UA, realizing rapid remote control over the PLC. When the digital twin utility tunnel system receives data that exceeds an alarm threshold, a preset script is applied to automatically control the PLC devices through the Internet of Things to prevent further evolution and escalation of accidents.

In the present application, motion control over the mobile inspection robot and acquisition of sensor data are realized through a robot operating system (ROS), application development of the mobile inspection robot is performed by using a node that writes lightweight processes, connection with the mobile inspection robot is performed by wireless communication, automatic control over the mobile inspection robot is realized through an ROS preset program, and motion reliability and performance of the mobile inspection robot in the utility tunnel are improved by a distributed calculation manner provided by the ROS. Moreover, through a remote operating handle and a camera installed on the mobile inspection robot, the mobile inspection robot can be remotely operated manually, and internal pictures of the utility tunnel are viewed in real time, thereby reducing a number of personnel working and entering and exiting the utility tunnel.

The above descriptions are preferred embodiments of the present application and are not intended to the present application. For those skilled in the art, the present application may have various modifications and changes. Any modifications, equivalent replacements, improvements, and the like made within the spirit and principles of the present application shall be included in the protection scope of the present application.

What is claimed is:

1. A digital twin utility tunnel system based on a reduced-order simulation model and a real-time calibration algorithm, comprising a big data aggregation unit and a real-time simulation deduction unit, the big data aggregation unit being configured to collect real-time dynamic data of an utility tunnel and collect static attribute data of the utility tunnel, to build a three-dimensional (3D) physical model of the utility tunnel according to the static attribute data and build a 3D CFD (Computational Fluid Dynamics) numerical simulation model; the real-time dynamic data comprising fixed monitoring data and mobile monitoring data, the fixed monitoring data being collected by gas sensors fixedly installed in a gas compartment of the utility tunnel, and the mobile monitoring data being collected by mobile sensors, the mobile sensors being arranged in the gas compartment of the utility tunnel and movable in the utility tunnel; and the real-time simulation deduction unit comprising a forward prediction module and an inversion calibration module, the forward prediction module being configured to sample simulation results of the 3D CFD numerical simulation model based on a density function sampling method, and train an attention-mechanism-based deep learning model using sampled data, to build a data-driven reduced-order simulation model to predict a physical field in the utility tunnel in real time;

perform dimension reduction on an original matrix of the simulation results of the 3D CFD numerical simulation model based on proper orthogonal decomposition (POD) according to the formula:

$$\begin{cases} X' = U \times S \times V^T \\ V = [\varphi_1, \varphi_2, \ldots, \varphi_i, \ldots, \varphi_r]; \\ Y = X' \times S \end{cases}$$

obtain a reduced-order matrix under different boundary conditions;

wherein X' denotes the original matrix of the simulation results of the 3D CFD numerical simulation model, Y denotes the reduced-order matrix after dimension reduction based on the POD, U denotes a left singular vector obtained by a singular value decomposition (SVD) operation, S denotes a diagonal matrix comprising singular values, and V denotes an orthogonal basis function obtained by performing dimension reduction on the sampled data based on a POD-based non-intrusive ROM (Reduced Order Model) method; $\varphi_1, \varphi_2, \ldots, \varphi_i, \ldots, \varphi_r$ denote r left singular vectors in the orthogonal basis function V, r being a positive integer; i=1, 2, ..., r, perform time-series prediction on the reduced-order matrix based on the attention-mechanism-based deep learning model to obtain time-series changes of the physical field after dimension reduction; and according to the formula:

$$X' = \sum_{i=1}^{r} Y_i \times \varphi_i,$$

perform a dimension raising operation on the time-series changes of the physical field after dimension reduction to obtain prediction results of the physical field in the utility tunnel; wherein $Y_i$ denotes a column vector in the reduced-order matrix Y; and the inversion calibration module being configured to perform real-time calibration on the predicted physical field according to the real-time dynamic data and based on the real-time calibration algorithm;

train the reduced-order simulation model based on simulation data of the 3D CFD numerical simulation model of the utility tunnel to obtain a pre-trained model; and correct model parameters of the pre-trained model in real time based on the real-time dynamic data preprocessed in an actual application scene, to obtain the reduced-order simulation model for adaptive tuning prediction, wherein the real-time dynamic data is preprocessed and decomposed based on a GPOD (Gappy Proper Orthogonal Decomposition) method.

2. The digital twin utility tunnel system of claim 1, wherein the preprocessing of the real-time dynamic data based on the GPOD method specifically comprises: patching the real-time dynamic data and processing missing data and noise data based on the GPOD method.

* * * * *